United States Patent [19]
Rodriguez

[11] Patent Number: 5,373,868
[45] Date of Patent: Dec. 20, 1994

[54] BALL VALVE WITH MODULAR CHECK VALVE ASSEMBLY AND ACCESS PORT

[75] Inventor: Bertito T. Rodriguez, 2227 David Earl Dr., Charlotte, N.C. 28213

[73] Assignees: Bertito T. Rodriguez; Arthur T. Rodriguez; Ernesto T. Rodriguez; Herodutos T. Rodriguez; Oliver T. Rodriguez, all of Charlotte, N.C.

[21] Appl. No.: 160,775

[22] Filed: Dec. 3, 1993

[51] Int. Cl.[5] ............................................. F16K 5/06
[52] U.S. Cl. .................................. 137/614.17; 137/543
[58] Field of Search ................... 137/614.17, 614.16, 137/614.18, 543

[56] References Cited

U.S. PATENT DOCUMENTS

| | | | |
|---|---|---|---|
| 1,159,347 | 11/1915 | Angell | 137/543 |
| 1,890,223 | 12/1932 | Kilzer | 137/543 X |
| 3,854,497 | 12/1974 | Rosenberg | 137/614.17 X |

FOREIGN PATENT DOCUMENTS

| | | | |
|---|---|---|---|
| 374621 | 4/1923 | Germany | 137/614.17 |
| 2726645 | 12/1978 | Germany | 137/614.18 |
| 3816736 | 11/1989 | Germany | 251/315 |
| 3835144 | 4/1990 | Germany | 137/614.17 |

*Primary Examiner*—John C. Fox
*Attorney, Agent, or Firm*—Clifton Ted Hunt

[57] ABSTRACT

A ball valve is provided with an internal check valve which is of modular construction and with an external valve casing that includes a lateral extension defining an access port. The modular check valve assembly is threadably connected to the ball and the lateral extension is closed with a threadable closure. The threadable closure for the lateral extension and the threadable check valve assembly both have sockets to receive access tools and both sockets preferably have the same unique tamper proof configuration to receive the same access tool.

7 Claims, 4 Drawing Sheets

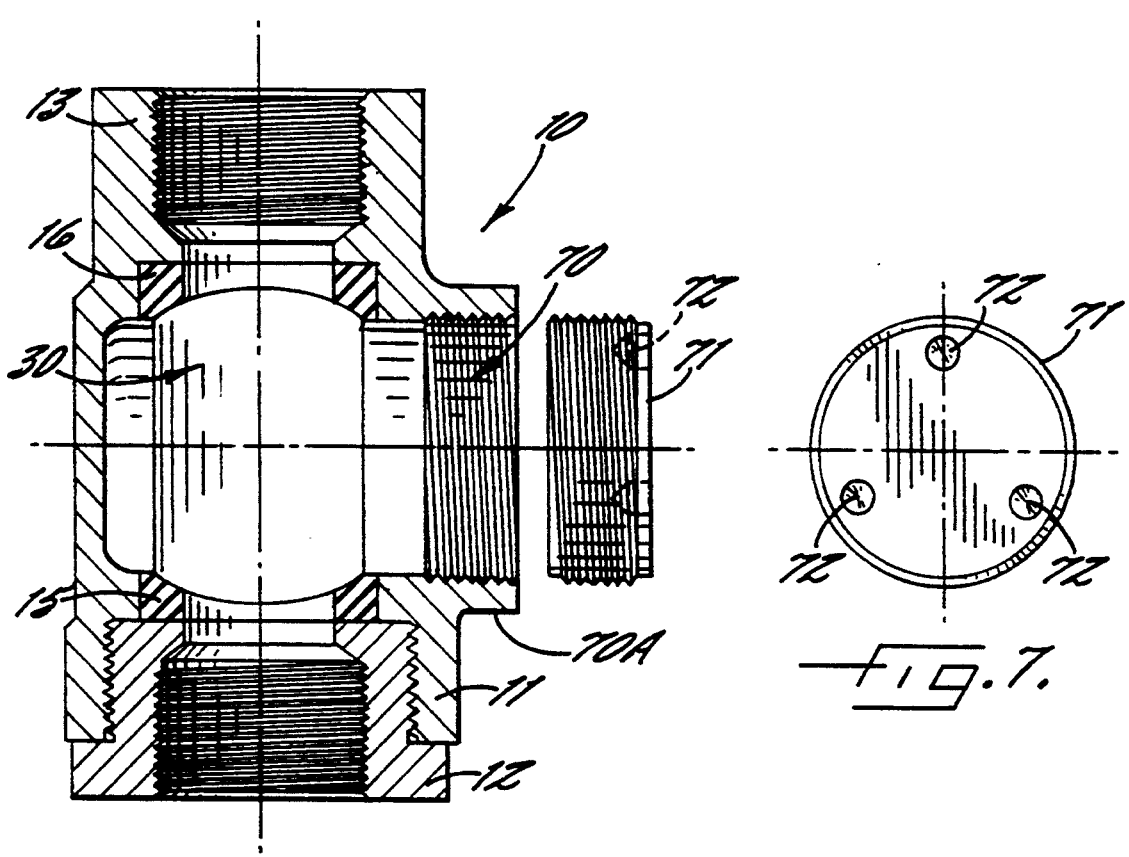
Fig. 6.
Fig. 7.
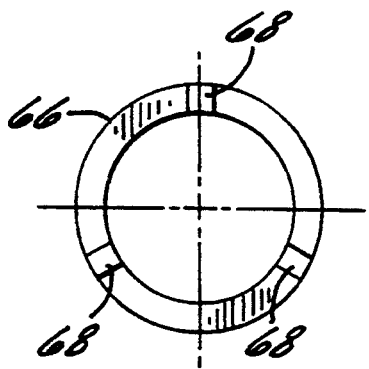
Fig. 9.
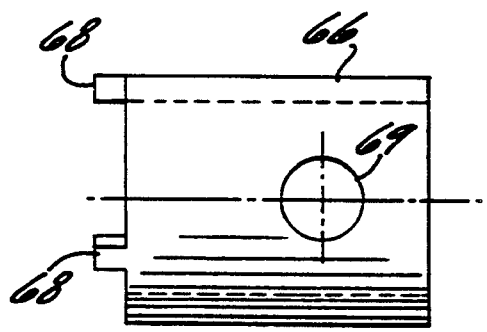
Fig. 8.

BALL VALVE WITH MODULAR CHECK VALVE ASSEMBLY AND ACCESS PORT

FIELD OF THE INVENTION

This invention relates to the control of fluids conveyed by piping, such as water, oil, and the like, and especially to the prevention of fluid flowing backwardly in the pipe (back flow).

BACKGROUND OF THE INVENTION AND PRIOR ART STATEMENT

It has been common practice for many years to provide two separate valves in a fluid-carrying pipe when it is desired to prevent back flow of the fluid. One type of shut-off valve, known as a ball valve, has been provided to shut off the flow of fluid when desired and a check valve has been additionally provided downstream from the ball valve to prevent back flow of the fluid in the event of a loss of pressure downstream from the ball valve.

The expense and inconvenience of installing two separate valves can be avoided according to the disclosure in U.S. Pat. No. 4,846,221 for BALL VALVE WITH BUILT-IN CHECK VALVE, issued Jul. 11, 1989 to Kitz Corporation of Tokyo, Japan upon application of Tonaharu Kanemaru. The Kanemaru patent discloses a valve casing having a ball with a built-in check valve that is moved into operable position when the ball is rotated to the open position in the usual fashion to permit the flow of fluid. This built-in check valve is an improvement over the prior practice of using two separate valves.

But, check valves inevitably need repair or replacement. When Kanemaru's check valve needs either repair or replacement, it is first necessary to close a shut-off valve upstream from the damaged check valve, then remove the valve casing containing the damaged check valve, and then remove the ball from the valve casing to gain access to Kanemaru's check valve within the ball. The parts of Kanemaru's check valve 3 requiring repair or replacement must then be dis-assembled and replaced with operative parts which need be carefully re-assembled within Kanemaru's ball 2 in order for his movable valve body 7 to operably register with the valve seat 6 in Kanemaru's ball 2.

The aforesaid difficulty and inconvenience of gaining access to a valve within a ball is obviated by the disclosure in U.S. Pat. No. 3,146,792, issued Sep. 1, 1964, to Donnelly. Donnelly shows a ball 3 with an excess flow valve assembly 31 inserted in the hole in the ball, and a lateral extension 11 for gaining access to the excess flow valve assembly 31 when the ball 3 is turned to the closed or shut-off position. The outer end of Donnelly's chamber 13 is closed by a threaded cap 63, which may be removed with a conventional tool for access to the excess flow valve assembly 31.

Neither Kanemaru or Donnelly show a modular check valve in the ball. Donnelly's easily removable threaded cap 63 is dangerous because of the possibility of the cap 63 being accidentally or maliciously removed while the ball 3 is turned to the open or on-line position; or maliciously removed for the purpose of tampering with the valve or contaminating the contents of the pipe line system in which the valves are installed.

SUMMARY OF THE INVENTION

The present invention provides the ball within a ball valve with an easily removable and replaceable modular check valve assembly that is entirely self-contained. The valve casing of the ball valve has a laterally opening access port with a tamper-proof closure, and the modular check valve assembly is fastened within the ball with a tamper proof closure, preferably requiring the use of a tool like that needed to open the access port.

BRIEF DESCRIPTION OF THE DRAWINGS

FIG. 6 is a sectional view illustrating the relationship of the ball with the access port in the valve casing;

FIG. 7 is an end view of the closure for the access port, looking at the right side of FIG. 6.

FIG. 8 is a side view of a removal tool configured to fit the closure for the access port and to fit the seat of the modular check valve assembly; and FIG. 9 is an end view of the removal tool, looking at the left side of FIG. 8.

DETAILED DESCRIPTION OF THE INVENTION

Figure 1:
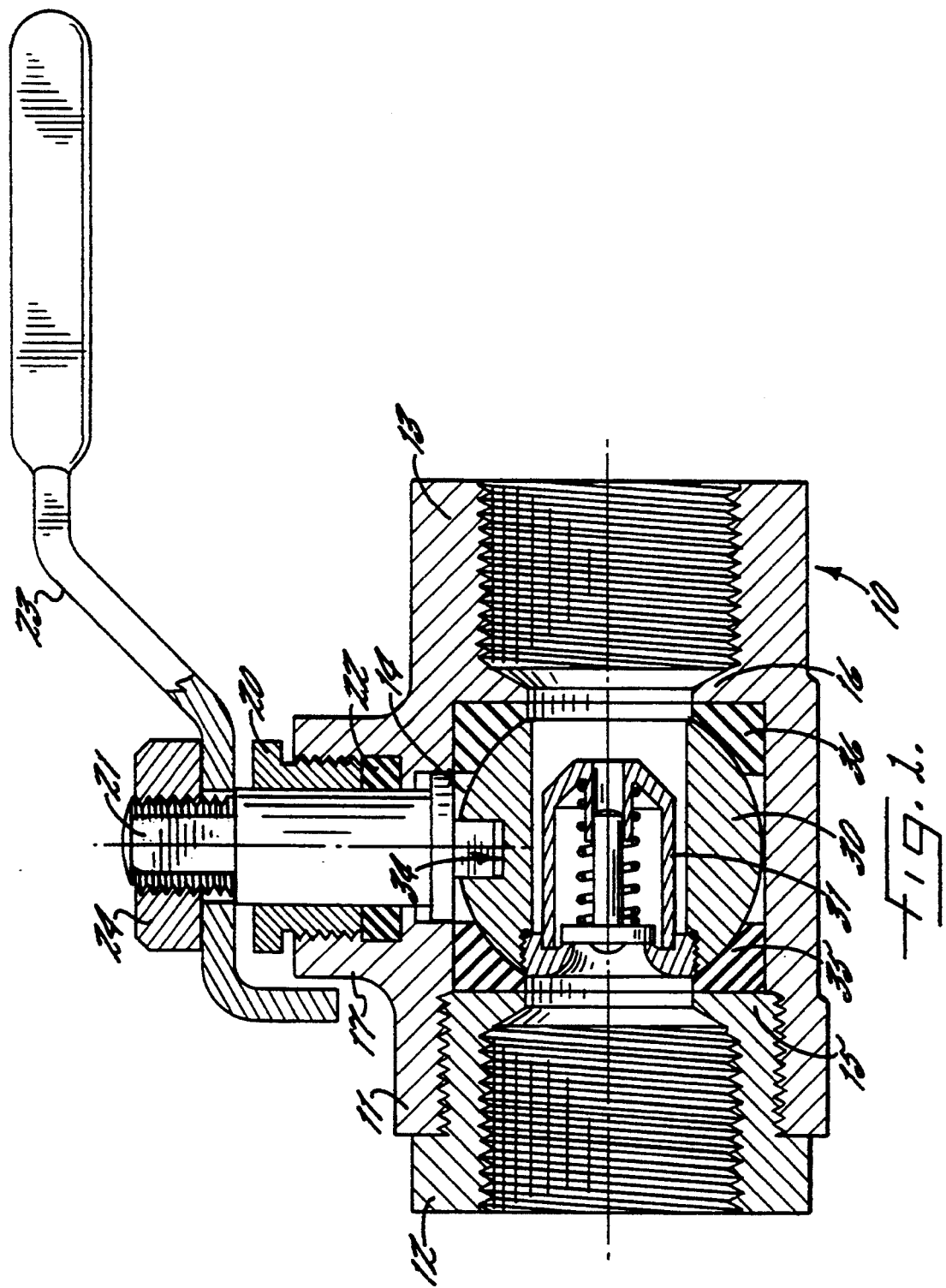
FIG. 1 is a longitudinal sectional view of a valve casing containing a ball combined with a modular check valve.

Referring more specifically to the drawings, the numeral 10 broadly designates a valve casing. The valve casing 10 includes an inlet end portion 11 that is interiorly threaded to receive an externally and interiorly threaded retainer 12. An outlet end portion 13 of the valve casing 10 is spaced downstream within the valve casing from its inlet end portion 11. The outlet end portion 13 is interiorly threaded to receive a length of externally threaded pipe (not shown) in a piping system in which the valve casing 10 may be installed.

The space between the inlet end portion 11 and the outlet end portion 13 is an open chamber 14 defined by a first annular shoulder 15 at the inner end of the retainer 12 and by a second annular shoulder 16 at the inner end of the outlet portion 13. A stem housing 17 forms part of the valve casing 10 and projects perpendicularly to the longitudinal axis of the valve casing between the inlet end portion 11 and the outlet end portion 13. The stem housing is internally threaded to receive an externally threaded gland nut 20 that houses a stem 21 extending vertically from the chamber 14 through an O-ring 22 at the inner end of the gland nut 20 in FIG. 1. The upper end of the stem 21 in FIG. 1 penetrates a lever or handle 23 and is held in place by a lever nut 24.

Figure 2:
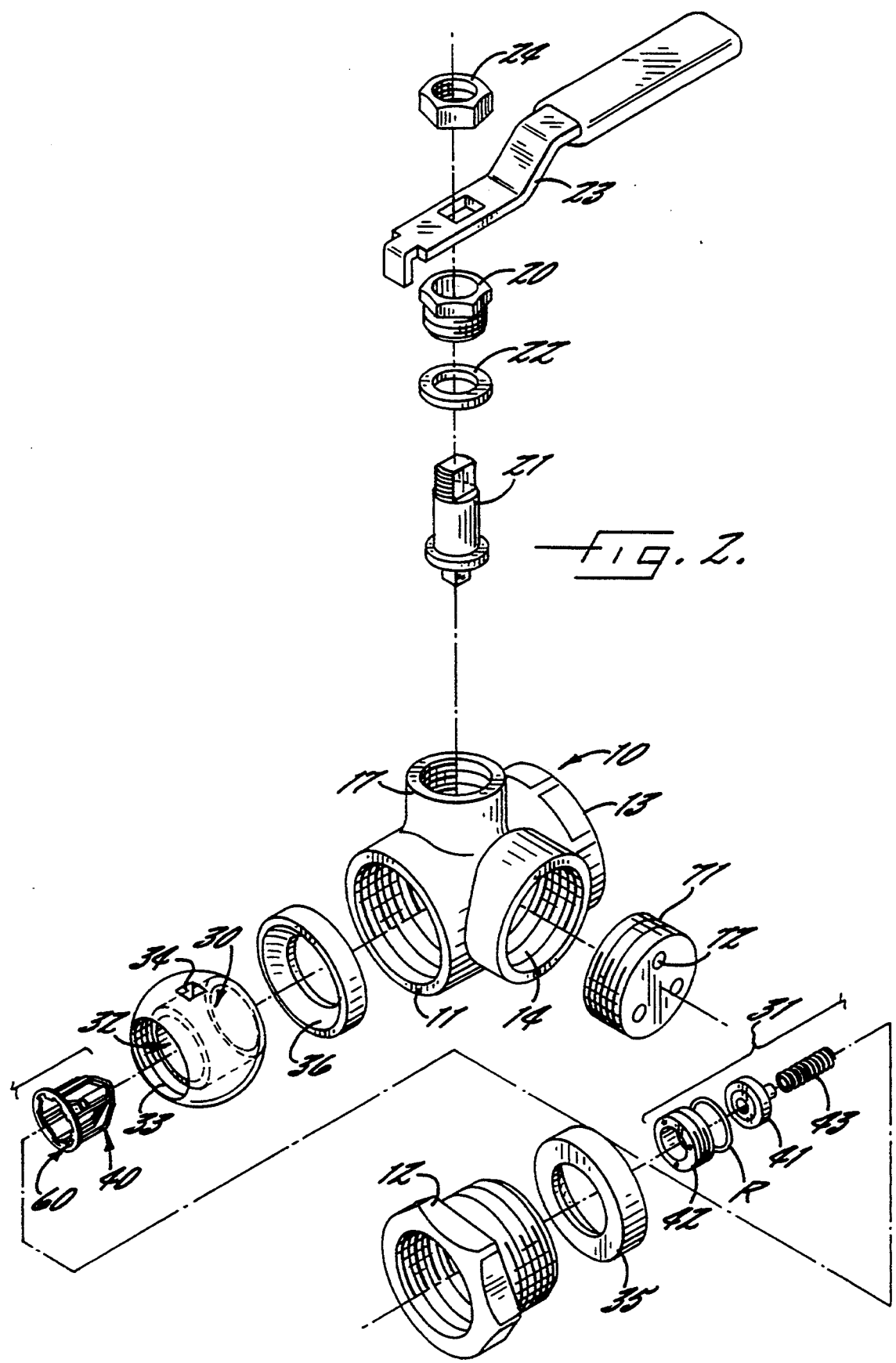
FIG. 2 is an exploded perspective view illustrating the assembly of a valve casing having an access port with a ball containing a modular check valve.

Before the retainer 12 is threaded into the inlet end 11, a ball 30 and check valve assembly, broadly indicated at 31, are assembled within the chamber 14 between seats 35 and 36 on the annular shoulders 15 and 16. The ball 30 has a through opening 32. One end of the opening 32 is internally threaded as at 33. The ball 30 has a peripheral slot 34 extending in parallel relation to the opening 32 through the ball 30 in FIG. 2. The slot 34 receives the inner end of the stem 21, whereby, in response to actuation of the lever 23, the ball is rotated between the open and closed positions in the chamber 14.

THE MODULAR CHECK VALVE ASSEMBLY

Figure 3:
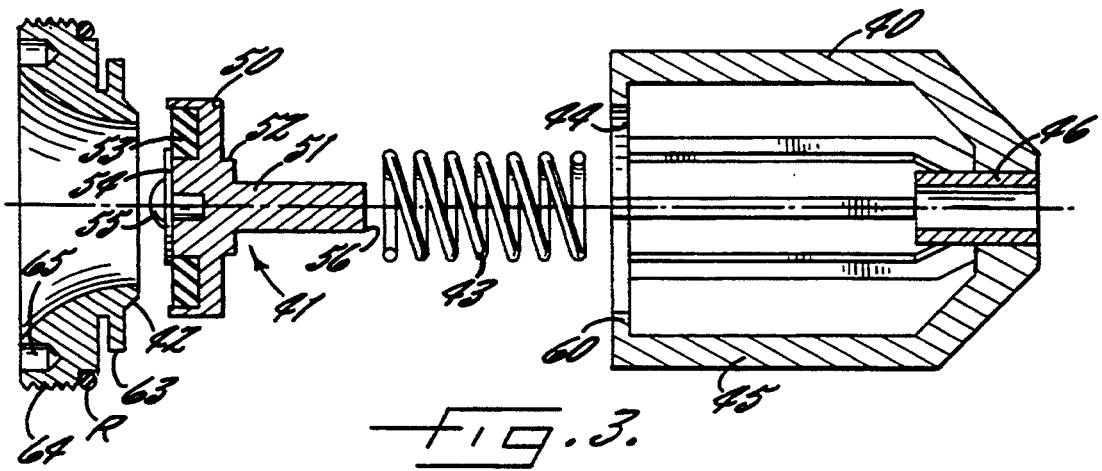
FIG. 3 is an exploded sectional view, partially in elevation, illustrating the assembly of the components of the modular check valve.

Referring to FIG. 3, the modular check valve assembly 31 comprises a cage 40, a poppet assembly 41, a seat 42, and a spring 43. The cage 40 includes a circular base 44 from which extend a plurality of angular arms 45 that are spaced from one another and converge around a sleeve 46 spaced from the base 44.

The poppet assembly 41 comprises a circular cup-shaped base 50 from which extends a spring retaining shaft 51 having an annular shoulder 52 at the juncture of the shaft 51 with the base 50. A resilient seal 53 is retained within the cup-shaped base 50 by a washer 54 and a fastener 55.

The spring 43 fits around the shoulder 52 and is supported on the shaft 51 and sleeve 46 when the poppet assembly is assembled with the free end 56 of the shaft 51 surrounded by the sleeve 46 within the cage 40. An O-ring R surrounds the seat 42 at its juncture with the cage 40, when assembled. As most clearly seen in FIGS. 2 and 3, the base 44 of the cage 40 is serrated to define inwardly extending projections 60 that are spaced from one another and register with lugs 63 on the seat 42 to unite the assembled components of the modular check valve assembly 31.

Figure 4:
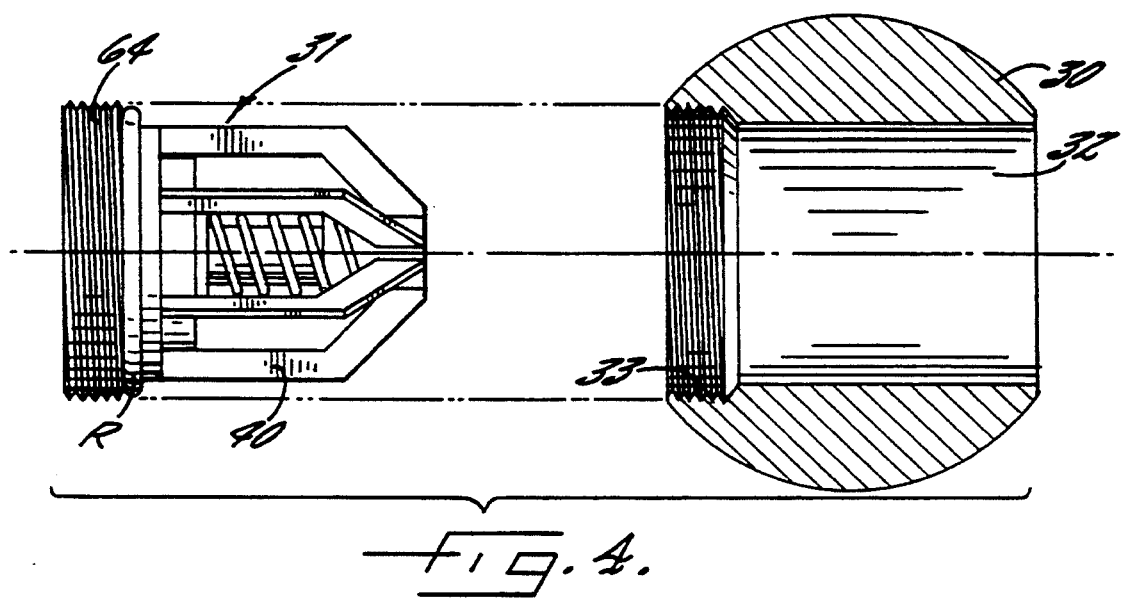
FIG. 4 is an exploded side view, partially in section, illustrating the assembly of the modular check valve in the ball.

The seat 42 of the assembled check valve assembly 31 is externally threaded as at 64 to register with the internally threaded portion 33 of the ball 30 when the modular check valve assembly 31 is operatively positioned within the opening 32 in the ball 30, as best seen in FIG. 4.

Figure 5:
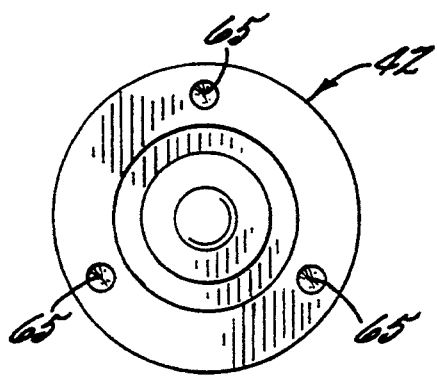
FIG. 5 is an end view of the modular check valve, looking at the left side of FIG. 4.

The free end portion of the seat 42 is shown to have a group of three equally spaced outwardly opening recesses 65 (FIG. 5) to receive a tubular removal tool 66 (FIGS. 8 and 9). Three equally spaced studs 68 project from one end of the tool 66 in planes parallel with the axis of the tool.

The spacing of the studs 68 corresponds with the spacing of the recesses 65 in the seat 42 of the check valve assembly 31 for the purpose of enabling the tool 66 to register with the seat 42 when threadably connecting the modular check valve assembly 31 within the ball 30, and when disconnecting the assembly 31 from the ball 30. The removal tool 66 comprises a tubular body portion 67 having diametrically opposed openings 69 to receive a rod or shaft (not shown) to provide leverage when using the tool.

The resilient seal 53 is urged toward the seat 42 in the modular check valve assembly 31 by the spring 43 but in normal operation the pressure of fluid against the poppet assembly moves the poppet assembly away from the seat 42 to permit the fluid to move downstream. When the downstream fluid pressure drops below a predetermined level, the spring 43 moves the seal 53 against the seat 42 to prevent back flow of the fluid.

THE ACCESS PORT

The valve casing 10 includes an interiorly threaded access port 70 which provides access to the check valve assembly 31 when the ball 30 is rotated to the closed position of FIG. 6. The access port 70 is formed by a lateral extension 70A of the valve casing. The lateral extension 70A has a tubular opening communicating at its inner end with the chamber 14 in the valve casing 10 and at its outer end with the atmosphere to define the access port 70. The outer end of the access port 70 is closable by an externally threaded plug 71. The plug 71 has a group of three equally spaced outwardly opening recesses 72 in its outer surface.

The spacing of the recesses 72 corresponds with the spacing of the studs 68 on the removal tool 66 for the purpose of enabling the tool 66 to register with the plug 71 when closing or opening the access port 70. As shown, the spacing of the recesses 72 also corresponds to the spacing of the recesses 65 in the seat 42 of the popper valve assembly 31 so the same tool 66 can be used to first open the access port 70 and to then remove the valve assembly 31 from the ball 30.

In use, the ball 30 is rotated to the closed position of FIG. 6, thereby moving the check valve assembly 31 into registry with the access port 70. The studs 68 on the tool 66 are then inserted in the recesses 72 in the plug 71 and the tool 66 is manipulated in the usual manner to unscrew the plug 71 from the access port 70. The tool 66 is of sufficient length to then be inserted in the open access port 70 and engage the studs 68 with the recesses 65 in the seat 42 of the check-valve assembly 31. When the check valve assembly 31 is unscrewed from the ball 30, the entire check valve assembly 31 is bodily removed from the ball 30 and from the valve casing 10 for repair or replacement.

The repaired assembly 31 or replacement assembly 31 is screwed into the ball 30 by using the tool 66, after which the tool 66 is used to close the access port 70 with the plug 71.

Although specific terms have been used in describing the invention, they have been used in a generic and descriptive sense only and not for the purpose of limitation, the scope of the invention being determined by the appended claims when considered with this specification, the accompanying drawings, and the prior art.

I claim:

1. A ball valve movable between an open position and a closed position within an open-ended valve casing enclosing the ball valve, the ball valve having a through opening communicating with the open ends of the valve casing when the ball valve is in its open position and a check valve within the through opening in the ball valve, wherein the improvement comprises:
    (a) the check valve is a modular check valve assembly,
    (b) means for releasably threading the modular check valve assembly into the through opening in the ball valve, and
    (c) means defining an access port in one side of the valve csaing, whereby the modular check valve assembly in the through opening in the ball valve is aligned with the access port in the valve casing when the ball valve is turned to its closed position and whereby the modular check valve assembly can then be unthreaded and removed as a unit from the through opening in the ball valve for replacement or repair.

2. The invention of claim 1 wherein the modular check valve assembly comprises a cage, a seat, a poppet assembly including a base, a seal within the base, a shaft extending from the base, a spring surrounding the shaft and extending between the base and the cage, and means for releasably interlocking the cage and the seat with the spring urging the seal toward the seat.

3. The invention of claim 1 wherein the access port comprises a lateral extension of the valve casing, the lateral extension having a tubular opening communicating at its inner end with the chamber in the ball and at its outer end with the atmosphere, and a removable plug normally closing the outer end of the access port.

4. The invention of claim 3 wherein the removable plug is threadably connected to the lateral extension of the valve casing, a removal tool, and the plug being exteriorly configured to register with the removal tool.

5. The invention of claim 4 wherein the removable plug has a group of recesses and the removal tool has a corresponding group of studs to register with the recesses in the plug.

6. A ball valve having a valve casing enclosing the ball and having a check valve within the ball, wherein the improvement comprises:
   (a) the check valve is a modular check valve assembly,
   (b) the modular check valve assembly comprises:
      (1) a cage,
      (2) a seat,
      (3) a poppet assembly including:
         (i) a base,
         (ii) a seal within the base,
         (iii) a shaft extending from the base,
         (iv) a spring surrounding the shaft and extending between the base and the cage and
      (4) means for releasably interlocking the cage and the seat with the spring urging the seal toward the seat;
   (c) means for installing and removing the modular check valve assembly as a single unit relative to the ball,
   (d) the valve casing having an access port, whereby the modular check valve assembly can be removed from the ball without removing the ball from the valve casing,
   (e) the seat of the modular check valve assembly has a group of recesses, and
   (f) a complementary removal tool configured to be received in the recesses in the seat.

7. A ball valve having a valve casing enclosing the ball and having a check valve within the ball, wherein the improvement comprises:
   (a) the check valve is a modular check valve assembly,
   (b) the modular check valve assembly comprises:
      (1) a cage,
      (2) a seat,
      (3) a poppet assembly including:
         (i) a base,
         (ii) a seal within the base,
         (iii) a shaft extending from the base,
         (iv) a spring surrounding the shaft and extending between the base and the cage and
      (4) means for releasably interlocking the cage and the seat with the spring urging the seal toward the seat;
   (c) means for installing and removing the modular check valve assembly as a single unit relative to the ball,
   (d) the valve casing having an access port, whereby the modular check valve assembly can be removed from the ball without removing the ball from the valve casing,
   (e) the seat of the modular check valve assembly has a group of recesses,
   (f) a complementary removal tool configured to be received in the recesses in the seat, and
   (g) the configuration of the removal tool comprising a group of studs arranged to register with the recesses in the seat.

* * * * *